INVENTOR.
TOSHI SUZUKI
KAORU ISHII
BY Louis Bernar
ATTORNEY

INVENTORS
TOSHI SUZUKI
KAORU ISHII
BY [signature]
ATTORNEY

United States Patent Office 3,443,040
Patented May 6, 1969

3,443,040

MAGNETIC TRANSDUCER HEAD WITH SINGLE TURN WINDING OF SELF-HARDENING MATERIAL

Toshi Suzuki, Kamakura, and Kaoru Ishii, Yokohama, Japan, assignors to Victor Company of Japan, Limited, Yokohama, Japan, a corporation of Japan Filed May 4, 1965, Ser. No. 453,006
Claims priority, application Japan, May 7, 1964, 39/25,581
Int. Cl. G11b 5/20
U.S. Cl. 179—100.2 3 Claims

ABSTRACT OF THE DISCLOSURE

The invention provides a new and novel magnetic transducer head. Prior art had taught the use of loose wires soldered to certain transducer head parts. The mechanical movement of the head shook the wire with a resulting metal fatigue which broke the wire. The heat required to solder the wires, in this prior device, produced defective magnetic heads. The invention avoids both metal fatigue and solder heating through a use of a self-hardening filling material which rigidly fixes the entire wire without requiring the soldering iron heat.

This invention relates to a magnetic transducer head and a method of constructing the same, and more particularly to a transducer head for magnetically recording and reproducing signals such as television signals having high frequency components.

In accordance with a principal object of this invention, a magnetic transducer head is provided which is simple in construction and extremely small in size.

Another object of the invention is to provide a magnetic transducer head and a method of constructing the same to facilitate manufacture and to provide a head which is strong and durable.

A further object of the invention is to provide a magnetic transducer head in which parts subject to wear are readily replaced.

Still another object of the invention is to provide a magnetic transducer head which is highly sensitive and reliable in performance and which accurately records and/or reproduces signals such as television signals having high frequency components.

In accordance with this invention, a magnetic transducer head is provided which has a construction similar to that disclosed in patent application Ser. No. 371,556, now Patent No. 3,378,647. In particular, a tip member is provided having a rounded end for engagement with a tape or other magnetic record medium and with a gap extending from the rounded end to an aperture through the member, the tip member being sandwiched between a pair of electrode plates connected electrically by a conductor extending through the aperture in the tip member. The electrode plates are also connected by a conductor extending through a magnetic core having a winding thereon. Thus, a transformer is provided having a one-turn secondary which includes the conductor extending through the tip to induce a magnetic flux across the gap in response to varying currents in the winding and recording, or to induce a voltage in the winding in response to a varying magnetic flux across the gap.

This type of construction has important advantages, but it has been discovered that it is difficult in practice to obtain a good electrical connection between the electrode plates through the aperture and the tip member. In particular, it has been found that a wire extending through the aperture and soldered at its ends to the electrode plates is not always satisfactory because the heat applied during the soldering produces mechanical and magnetic strains, and also produces a mechanically weak construction. In addition, with a head of small size, such as required for recording and reproducing television signals or the like, the soldering operation is very difficult. Further, it is necessary that the wire project outwardly and an increase in air resistance is encountered when the head is rotated at high speeds, resulting in electrical and mechanical separation.

According to a very important feature of the invention, an electrically conductive self-hardening filling material is disposed in the aligned apertures of the tip and electrode members to electrically connect the electrode members. With such a material, the above-mentioned disadvantages of the solder connection are obviated. It is not necessary to apply heat and mechanical and magnetic strains are avoided, and since the apertures can be substantially filled by the material, the possibility of displacement of the tip member relative to the electrode members under the influence of centrifugal forces, is greatly reduced. The material need not project outwardly from the surfaces of the electrode members, so that it does not produce additional air resistance.

Furthermore, the material is readily applied, which is particularly advantageous with a magnetic head of small size, such as used in recording of television signals and the like.

According to a specific feature of the invention, a solid conductive wire is embedded within the filling material to extend from within the aperture in one of the electrode members through the aperture in the tip member and into the aperture in the other of the electrode members. With this feature, continuity of the electrical connection is insured, even with air pockets in the filling material, and the mechanical strength is increased while retaining the other advantages of the use of the filling material.

According to a further specific feature of the invention, the filling material is an amalgam alloy, which is particularly advantageous in that it can be readily applied and provides a connection having a low electrical resistance while having a high mechanical strength. However, other filling materials may be used such as mixtures of silver, aluminum or other metallic powders with a cementing agent, electrically conductive paints, electrically conductive rubber, or electrically conductive organic substances. It should be understood that the term "self-hardening" as used herein means any material which can be applied in a paste, liquid or semi-liquid condition to harden within the apertures under ambient conditions or temperatures below that at which mechanical or magnetic strains would be produced.

Additional features of the invention relate to an arrangement which permits ready removal and replacement of parts subject to wear, particularly the tip member and electrode plates.

This invention contemplates other and more specific objects, features and advantages which will become more fully apparent from the following detailed description taken in conjunction with the accompanying drawings which illustrate preferred embodiments and in which.

Figure 1:
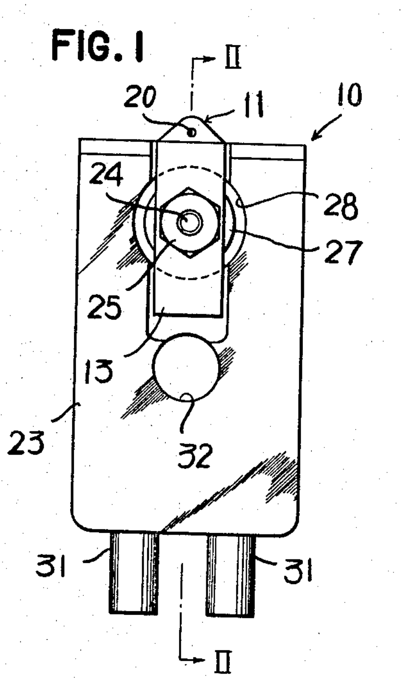
FIGURE 1 is a top plan view of a magnetic transducer head assembly of a type heretofore proposed.
Figure 3:
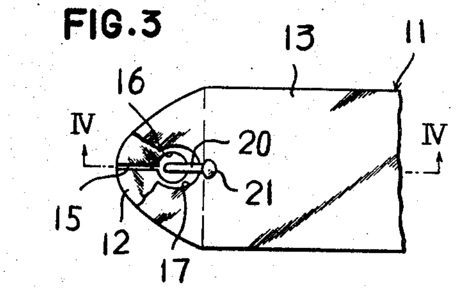
FIGURE 3 is a top plan view, on an enlarged scale, with one part partially broken away, of a tip portion of the magnetic head assembly shown in FIGURES 1 and 2, using a prior type of soldered connection.
Figure 5:
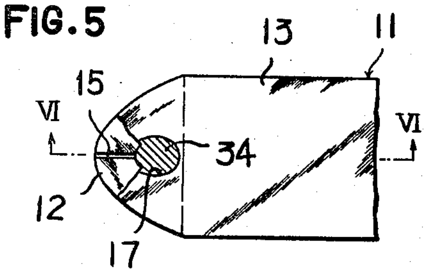
FIGURE 5 is a top plan view similar to FIGURE 3 but illustrating a construction according to the present invention.
Figure 6:
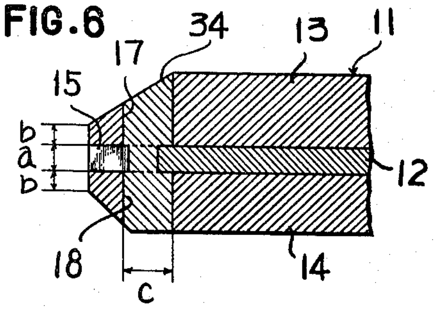
Figure 7:
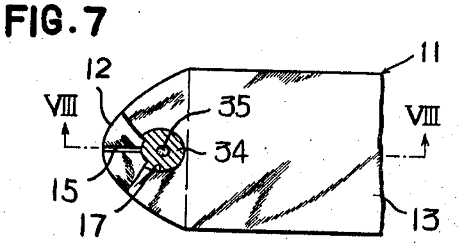
Figure 8:
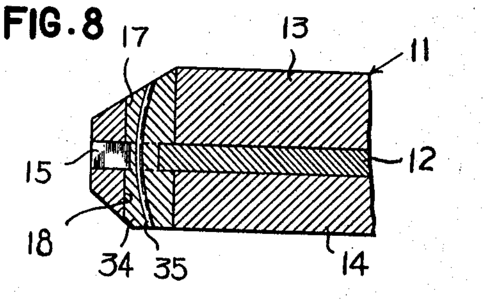
Figure 9:
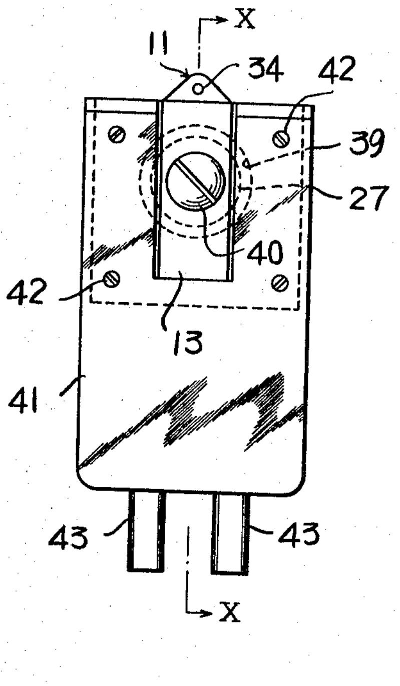
Figure 10:
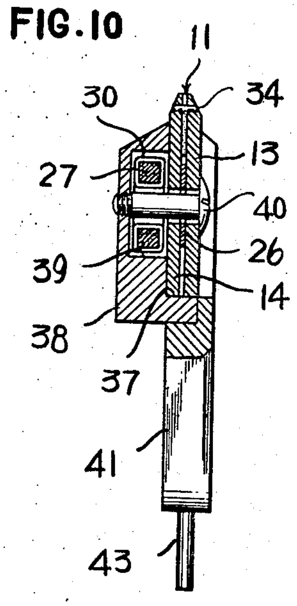

FIGURE 6 is a sectional view taken substantially along line VI—VI of FIGURE 5;

FIGURE 7 is a top plan view similar to FIGURES 3 and 5, showing another embodiment of a tip portion of a magnetic head constructed according to the invention;

FIGURE 8 is a sectional view taken substantially along line VIII—VIII of FIGURE 7;

FIGURE 9 is a top plan view, similar to FIGURE 1, illustrating a magnetic transducer head assembly constructed according to the invention; and FIGURE 10 is a sectional view taken substantially along line X—X of FIGURE 9.

Figure 2:
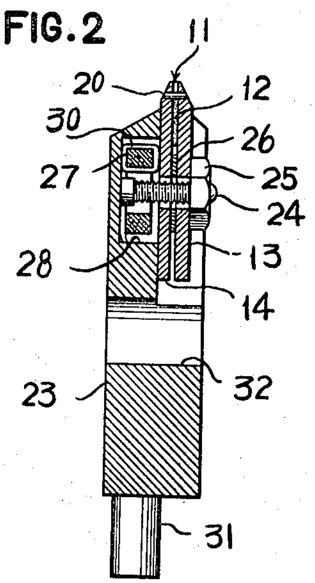
FIGURE 2 is a sectional view taken substantially along line II—II of FIGURE 1.

Referring to FIGURES 1 and 2, reference numeral 10, generally designates a magnetic head assembly of a type heretofore proposed, which comprises a tip 11 for engagement with a magnetic tape or other magnetic recording medium. The assembly 10 may preferably be mounted for rotation in an apparatus of the type used for recording television signals or the like, having high frequency components.

The tip 11 comprises a tip member 12 of magnetic material, which is sandwiched between a pair of electrode members 13 and 14 in the form of flat plates of metal or other conductive material. The tip member 12 and the electrode plates 13 and 14 have aligned rounded ends to facilitate smooth engagement with the magnetic recording medium, and as illustrated, the electrode plates are beveled to provide a cross-sectional area at the rounded ends less than the cross-sectional area at points spaced therefrom.

Figure 4:
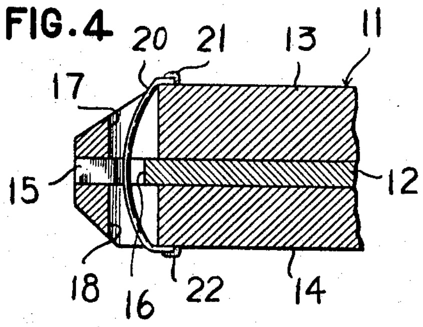
FIGURE 4 is a sectional view taken substantially along line IV—IV of FIGURE 3.

The tip member 12 is formed with a narrow gap 15 extending from the rounded end thereof to an aperture 16 therethrough, and the electrode plates 13 and 14 are provided with openings or apertures 17 and 18 aligned with the aperture 16, but preferably of somewhat greater cross-sectional area. In an arrangement as heretofore proposed, and as shown in FIGURES 3 and 4, a wire 20 extends through the apertures 16, 17 and 18 and solder joints 21 and 22 are provided between the opposite ends of the wire at 20 and outer surface points of the electrode plates 13 and 14.

The tip 11 is disposed against a base member 23 having an externally threaded stud 24 projecting throughaligned openings in the electrode plates 13 and 14, with a nut 25 being threaded on the end of the stud 24 to hold the parts in assembly. A washer 26 of insulating material, having a thickness approximately equal to that of the tip member 12, is disposed between the electrode plates 13 and 14 about the stud 24.

A magnetic core member 27 is disposed in the recess of the base member 23 about the stud 24, and the winding 30 is provided on thecore member 27.

With this arrangement, a transformer is provided having a one-turn secondary, formed by the base member 23, the stud 24, the plates 13 and 14 and the wire 20. When an alternating current is applied to the winding 30, a current flows in the one-turn secondary so formed, and current flowing through the wire 20 induces a varying magnetic flux across the gap 15. In reproducing, a varying magnetic flux across a gap 15 produces a current in the one-turn secondary to induce a corresponding voltage in the winding 30.

Terminal members 31 are preferably provided on the base member 23 for connection of the winding 30 to an external circuit, and the base member 23 is provided with an opening 32 for mounting of the assembly on a suitable support .

This construction has a number of advantages, including the fact that the tip 11 can be readily removed and replaced, as may be periodically necessary due to wear of the end of the tip through engagement with the magnetic recording medium. The construction is also advantageous in that the parts are readily manufactured and assembled and can be very small in size.

However, with the solder joints 21 and 22 as shown in FIGURES 3 and 4, it has been discovered that disadvantages arise because the tip is subjected to heat during the soldering operation to produce mechanical and magnetic strains. In this connection it is noted that tip member 12 is preferably of a magnetic material such as ferrite which may be easily damaged by excessive heat. In addition, the soldering is very difficult to perform with parts of small size, and the construction also has the disadvantage that the ends of the wire 20 and the solder joints 21 and 22 project to be subject to the forcesof air currents at high speeds.

FIGURES 5 and 6 are similar to FIGURES 3 and 4, but illustrate a construction according to the invention, wherein the wire 20 and the solder joints 21 and 22 are eliminated, and wherein the apertures 16, 17 and 18 are filled with a self-hardening electrically conductive filling material 34, operative to electrically connect the electrode plates 13 and 14. With this feature, a connection is provided having a low electrical resistance but having a high mechanical strength, and the connection is established without application of excessive heat and without the disadvantages arising from the application of heat. Further, the self-hardening filling material 34 is relatively easy to apply, as compared to a soldering operation, particularly when the parts are of small size. In this connection, the parts may have dimensions, by way of example, such that the thickness "*a*" of the tip member 12, as illustrated in FIGURE 6, is 0.15 mm., the thickness "*b*" of the reduced end portions of the plates 13 and 14 is from 0.10 to 0.15 mm. As above noted, the tip member 12 may preferably be of ferrite and the electrode plates 13 and 14 may preferably be of beryllium copper.

The self-hardening filling material 34 may be formed of a mixture of a metallic powder such as silver or aluminum with a cementing agent, an electrically conductive paint such as those marketed under the trade names of Dotite or Markite, an electrically conductive rubber or an electrically conductive organic substance or plastic, but preferably the material is an amalgam alloy and most preferably, it may be produced substantially as follows:

A composition containing 69% of silver, 26% of tin, 4% of copper and 1% of zinc is kneaded in a mortar with mercury by weight ratio of 1:1.6 at a rotating speed of from 120 to 160 r.p.m. for forty to sixty seconds. The product thus obtained is enclosed in a gauze and lightly squeezed to remove the excess of mercury to thereby obtain an amalgam alloy retained in the gauze. The amalgam alloy so obtained is applied into the apertures 16, 17 18 and becomes hardened after one to two hours.

With the apertures being of very small size, it is difficult to prevent an occasional production of an air bubble or void within the material, which could result in complete separation. To insure against such an occurrence, a modified construction as shown in FIGURES 7 and 8 may be used, wherein a conductive wire 35 is embedded within the filling material to extend from within the aperture 17 through the aperture 16 and into the aperture 18. The wire 35 insures a good electrical connection and also increases the mechanical strength.

FIGURES 9 and 10 illustrate an overall construction similar to that of FIGURES 1 and 2, but having improvements thereover. In this construction, the tip 11, including the tip member 12 and the electrode plates 13 and 14 and preferably also including the filling material 34 and the wire 35, is disposed in a groove 37 of a base member 38 of conductive material, the base member 38 having a recess 39 in which the core 27 and winding 30 thereon are disposed. In this construction, a screw 40 is provided which extends through openings in the plates 13 and 14 as well as through the washer 26 and through the core member 27 to be threaded into the base member 38 and to hold the parts in assembly. The tip 11 may, however, be readily removed and replaced by merely removing the screw 40.

The base member 38 is secured to a separate body member 41 by means of screws 42, which operate to permit a fine adjustment of the position of the tip 11. Terminals 43 are carried by the body member 41, for connection of the coil or winding 30 to an external circuit.

It will be understood that modifications and variations may be effected without departing from the spirit and scope of the novel concepts of this invention.

We claim as our invention:

1. In a magnetic transducer head, a tip member of magnetic material having an aperture therethrough and a gap extending from said aperture to one end thereof, a pair of electrode members of electrically conductive material on opposite sides of said tip member having apertures aligned with said aperture in said tip member, transformer means connected to said electrode members, and an electrically conductive self-hardening filling material comprising a mixture in the approximate proportions of 69% silver, 26% tin, 4% copper, and 1% zinc wetted by mercury, said material filling said apertures for electrically connecting said electrode members and for inducing a magnetic flux across said gap in response to current flow between electrode members through said material, said self-hardening filling material being smoothed so that it does not protrude beyond the surface of said electrode member.

2. In a magnetic transducer head, a tip member of magnetic material having an aperture therethrough and a gap extending from said aperture to one end thereof, a pair of electrode members of electrically conductive material on opposite sides of said tip member, said electrodes having apertures aligned with said aperture in said tip member, a mounting base of electrically conductive material, transformer means mounted on said base and comprising a closed core of magnetic material, winding means on said core, means including a conductive material extending through both of said electrode members to hold one of said electrode members in electrical contact with said mounting base and to establish an electrical connection from the other of said electrode members through said core to said mounting base, a body member on which said base is mounted, and an electrically conductive self-hardening filling material in said apertures for electrically connecting said electrode member to form a single turn secondary for said transformer, said self-hardening filling material having characteristics wherein said material may be inserted into said aperture, shaped not to protrude from said electrode member and then harden under ambient temperature conditions without requiring a heating step.

3. The transducer of claim 2 wherein said alloy comprises a composition containing approximately 69% silver, 26% tin, 4% copper, and 1% zinc amalgamated with a small percentage of mercury.

References Cited

UNITED STATES PATENTS

| | | | |
|---|---|---|---|
| 2,864,156 | 12/1958 | Cardy | 29—625 |
| 3,040,119 | 6/1962 | Granzow | 29—625 |
| 3,378,647 | 4/1968 | Hirota | 179—100.2 |

BERNARD KONICK, *Primary Examiner.*

J. RUSSELL GOUDEAU, *Assistant Examiner.*

U.S. Cl. X.R.

340—174.1; 346—74